United States Patent
Chang et al.

(10) Patent No.: US 9,709,153 B2
(45) Date of Patent: Jul. 18, 2017

(54) PULLEY FOR ALTERNATOR (71) Applicant: Victory Industrial Corporation, New Taipei (TW)

(72) Inventors: Hung-Chih Chang, New Taipei (TW); Szu-En Liu, New Taipei (TW)

(73) Assignee: Victory Industrial Corporation, New Taipei (TW)

(*) Notice: Subject to any disclaimer, the term of this patent is extended or adjusted under 35 U.S.C. 154(b) by 146 days.

(21) Appl. No.: 14/587,012

(22) Filed: Dec. 31, 2014

(65) Prior Publication Data

US 2016/0010742 A1 Jan. 14, 2016

(30) Foreign Application Priority Data

Jul. 14, 2014 (TW) .............................. 103124191 A (51) Int. Cl.
*F16H 55/36* (2006.01)
*F16H 7/08* (2006.01)

(52) U.S. Cl.
CPC ........ *F16H 55/36* (2013.01); *F16H 2055/366* (2013.01)

(58) Field of Classification Search
CPC .. F16H 55/36; F16H 2055/366; F16H 7/0877; F16D 3/52
See application file for complete search history.

(56) References Cited

U.S. PATENT DOCUMENTS

| | | | |
|---|---|---|---|
| 8,360,908 B2 * | 1/2013 | Serkh | |
| 8,419,574 B2 * | 4/2013 | Serkh et al. | |
| 2008/0108442 A1 * | 5/2008 | Jansen | F16D 3/52 464/54 |
| 2009/0176583 A1 | 7/2009 | Dell et al. | |
| 2010/0009796 A1 * | 1/2010 | Fitz | F16H 55/36 474/197 |
| 2010/0178990 A1 * | 7/2010 | Jansen | F16D 3/52 464/39 |
| 2012/0322592 A1 * | 12/2012 | Mortari | |
| 2013/0217524 A1 | 8/2013 | Antchak et al. | |
| 2013/0237351 A1 * | 9/2013 | Marion | B60K 25/02 474/70 |

(Continued)

FOREIGN PATENT DOCUMENTS

| | | |
|---|---|---|
| CN | 1668859 A | 9/2005 |
| CN | 1777765 A | 5/2006 |
| CN | 101874171 A | 10/2010 |

(Continued)

OTHER PUBLICATIONS

Extended European search report for related European application 14 200 744.2.

(Continued)

*Primary Examiner* — William E Dondero
*Assistant Examiner* — Robert T Reese (57) ABSTRACT

The present invention relates to a pulley for an alternator, and in particular, to a pulley applicable to an automotive alternator. The pulley effectively mitigates the problem that a belt and a tension pulley of an alternator vibrate because a rotation speed of a vehicle engine changes, thereby improving the overall operating efficiency of the alternator and the service life of the working belt and the tension pulley.

19 Claims, 3 Drawing Sheets

(56) References Cited

U.S. PATENT DOCUMENTS

2014/0141892 A1   5/2014  Williams

FOREIGN PATENT DOCUMENTS

| CN | 202188093 U    | 4/2012  |
|----|----------------|---------|
| CN | 102906441 A    | 1/2013  |
| CN | 102906464 A    | 1/2013  |
| CN | 101981351 B    | 4/2014  |
| EP | 2511557 A1     | 10/2012 |
| TW | M276709        | 10/2005 |
| TW | M390380        | 10/2010 |
| TW | M396894        | 1/2011  |
| TW | 201109552 A    | 3/2011  |
| WO | 2004/011818 A1 | 2/2004  |
| WO | 2005/057037 A1 | 6/2005  |
| WO | 2011/147024 A1 | 12/2011 |
| WO | 2011/160202 A1 | 12/2011 |
| WO | 2012/061930 A1 | 5/2012  |
| WO | 2012/061936 A1 | 5/2012  |

OTHER PUBLICATIONS

English translation of search report for corresponding TW application 103 124 194.

* cited by examiner

PULLEY FOR ALTERNATOR

CROSS REFERENCE TO RELATED APPLICATIONS

This application claims the benefit of priority from Taiwan patent application TW 103 124 191, filed Jul. 14, 2014, the contents of which are herein incorporated by reference.

BACKGROUND OF THE INVENTION

The present invention relates to a pulley for an alternator, and in particular, to a pulley for an automotive alternator.

An alternator is a type of generator that can produce an alternating current by converting mechanical energy into electrical energy. An automotive alternator converts mechanical energy of an engine into electrical energy to charge a battery, so as to supply electrical power to other electrical appliances on the automobile, and start a motor to rotate the engine.

An alternator generally has an annular stator and a rotor received in the annular stator. A wire is wound on the stator, and the rotor rotates rapidly in the stator so that the wire moves relative to a magnetic field generated by the rotor, and an induced electromotive force (voltage) is generated in the wire.

An automotive alternator is usually utilized by an engine driving a belt. The belt is wound on a pulley, and the pulley is connected to a rotor so as to drive the rotor to rotate. However, in conventional alternator design, when an engine starts, or accelerates or decelerates quickly in an instant, a waveform changes significantly at the moment the generator charges a battery, and it cannot be stabilized. In addition, one side of the belt wound on the pulley is tight, and the other side thereof is slack. The tension of the slack-side belt is low, and therefore a tensioner is disposed thereon to adjust the tension of the belt. However, when a rotation speed at which the engine transmits power changes suddenly, because the pulley of the generator is locked by a nut and the belt is made of a flexible material and cannot reflect the rotation speed immediately, a slip is easily caused between the belt and the pulley. Moreover, the fluctuation of the rotation speed causes the belt to bear not only a repeated stress but also a centrifugal force that is applied on the belt when the pulley rotates. The value of the centrifugal force changes with the rotation speed, and therefore the belt is often affected by adverse factors of an internal micro tension, which pulls the belt, and external large-amplitude shaking.

SUMMARY

In view of the deficiency of the prior art, the inventor proposes a pulley for an alternator which can effectively mitigate the vibration or belt slack or damage of the pulley caused by the speed change, thereby improving the overall operating efficiency and service life of the alternator.

To achieve the above objective, a pulley for an alternator according to the present invention includes an outer wheel, provided with an axle hole at the center; a clutch wheel, fixedly disposed in the axle hole of the outer wheel and having a pivot hole; a hollow connecting shaft, having a first end and a second end, where the first end is rotatably disposed in the pivot hole of the clutch wheel, so that the hollow connecting shaft maintains a co-rotational relationship with the outer wheel in a first relative rotation direction by means of the clutch wheel, while in a second relative rotation direction, the hollow connecting shaft is disassociated from the co-rotational relationship with the outer wheel, and presents an idling state; a hollow core shaft, having a first end and a second end, where the hollow core shaft is rotatably received in the outer wheel, and the second end of the hollow core shaft is rotatably arranged at the second end of the hollow connecting shaft; and an elastic element, disposed between the second end of the hollow connecting shaft and the second end of the hollow core shaft. When an external force drives the outer wheel to rotate, the outer wheel rotates relative to the hollow connecting shaft in the first relative rotation direction, and drives, through the clutch wheel, the hollow connecting shaft to rotate synchronously; the second end of the hollow connecting shaft presses the elastic element, and while being pressed, the elastic element pushes the second end of the hollow core shaft, thereby driving the hollow core shaft to rotate. When the external force decreases or stops driving the outer wheel to rotate, the hollow core shaft continues to rotate due to inertia, and stretches the elastic element, and while being stretched, the elastic element pulls the second end of the hollow connecting shaft, thereby driving the hollow connecting shaft to rotate relative to the outer wheel in the second relative rotation direction, so that the hollow connecting shaft is disassociated from the co-rotational relationship with the outer wheel, and idles in the clutch wheel.

According to another preferred embodiment of the present invention, the hollow core shaft passes through the hollow connecting shaft, and the first end of the hollow core shaft protrudes from the first end of the hollow connecting shaft; a tight-fit component is sleeved over an outer circumferential wall surface of the first end of the hollow core shaft in a tight-fit manner, and the tight-fit component is also tightly fit with an end surface of the first end of the hollow connecting shaft; therefore, the hollow connecting shaft and the hollow core shaft are made to corotate coaxially under a friction between the tight-fit component and the hollow connecting shaft and a friction between the tight-fit component and the hollow core shaft, and when the external force decreases or stops driving the outer wheel to rotate, the hollow core shaft continues to rotate due to inertia, and drives, through the tight-fit component, the hollow connecting shaft to rotate relative to the outer wheel in the second relative rotation direction, so that the hollow connecting shaft is disassociated from the co-rotational relationship with the outer wheel and idles in the clutch wheel.

According to another preferred embodiment of the present invention, the tight-fit component is a C-shaped retaining ring.

According to another preferred embodiment of the present invention, the second end of the hollow connecting shaft is provided with a first protruding portion, and the second end of the hollow core shaft is provided with a corresponding second protruding portion; the number of one of the first protruding portion and the second protruding portion is at least one, and the number of the other of the first protruding portion and the second protruding portion is at least two; and when a rotation angle of the hollow connecting shaft relative to the hollow core shaft exceeds a predetermined value, the first protruding portion of the hollow connecting shaft contacts the second protruding portion of the hollow core shaft, thereby stopping relative rotation between the hollow connecting shaft and the hollow core shaft, and setting the hollow connecting shaft and the hollow core shaft in a synchronous co-rotational relationship.

According to another preferred embodiment of the present invention, a first ball bearing is sleeved over the first end of the hollow core shaft, a second ball bearing is sleeved over the second end of the hollow core shaft, and the first ball bearing and the second ball bearing are disposed between the hollow core shaft and the outer wheel, so that the hollow core shaft is rotatable relative to the outer wheel.

According to another preferred embodiment of the present invention, three grooves are provided in a concave manner on an inner circumferential wall surface of the outer wheel, and an anaerobic adhesive is coated in the grooves, so that the clutch wheel, the first ball bearing, and the second ball bearing are separately tightly fit in the grooves, and are fixedly glued in the outer wheel by using the anaerobic adhesive.

According to another preferred embodiment of the present invention, a positioning casing is further sleeved over the first ball bearing, and an axial position of the pulley on the alternator is limited by the positioning casing.

According to another preferred embodiment of the present invention, an outer circumferential wall surface of the outer wheel is provided with a belt groove, for a belt to be wound on.

According to another preferred embodiment of the present invention, the belt is connected to a mechanical energy generating source, and the mechanical energy generating source provides an external force to drive the belt, thereby driving the outer wheel to rotate.

According to another preferred embodiment of the present invention, the mechanical energy generating source is an engine.

According to another preferred embodiment of the present invention, an inner circumferential wall surface of the hollow core shaft is provided with a threaded surface, the threaded surface is screwed with a joint lever having corresponding threads, and the joint lever is connected to a rotor, so that the hollow core shaft and the rotor corotate synchronously.

According to another preferred embodiment of the present invention, an inner circumferential wall surface of the outer wheel is provided with a step portion, for the clutch wheel to abut against, thereby limiting an axial displacement of the clutch wheel.

According to another preferred embodiment of the present invention, one end of the clutch wheel is provided with a positioning member, to limit an axial position of the clutch wheel, and the positioning member is a C-shaped retaining ring.

According to another preferred embodiment of the present invention, the elastic element is a torque spring, and a wire profile of the torque spring is circular, elliptical, or rectangular.

According to another preferred embodiment of the present invention, when the wire profile of the torque spring is rectangular, two end surfaces of the torque spring are grinded, so as to enhance axial positioning of the torque spring and control a free length of the torque spring more precisely.

According to another preferred embodiment of the present invention, two sides of the clutch wheel are each provided with an oil seal element, so as to prevent liquid in the clutch wheel from flowing into the outer wheel.

According to another preferred embodiment of the present invention, one side of one of the oil seal elements is provided with a positioning member, and the positioning member is sleeved over an inner side wall surface of the outer wheel in a tight-fit manner, to limit axial positions of the oil seal elements.

According to another preferred embodiment of the present invention, the positioning member is a C-shaped retaining ring.

According to another preferred embodiment of the present invention, an end, corresponding to the second end of the hollow core shaft, of the outer wheel is arranged with a dust cover, so as to prevent external dust from entering the outer wheel.

The present invention further provides a pulley for an alternator, which includes an outer wheel, provided with an axle hole at the center; a clutch wheel, fixedly disposed in the axle hole of the outer wheel and having a pivot hole; a hollow connecting shaft, having a first end and a second end, where the first end is rotatably disposed in the pivot hole of the clutch wheel, so that the hollow connecting shaft maintains a co-rotational relationship with the outer wheel in a first relative rotation direction by means of the clutch wheel, while in a second relative rotation direction, the hollow connecting shaft is disassociated from the co-rotational relationship with the outer wheel, and presents an idling state; a hollow core shaft, having a first end and a second end, where the hollow core shaft is rotatably received in the outer wheel, and the hollow core shaft passes through the hollow connecting shaft; the first end of the hollow core shaft protrudes from the first end of the hollow connecting shaft, and the second end of the hollow core shaft is rotatably arranged on the second end of the hollow connecting shaft; an elastic element, disposed between the second end of the hollow connecting shaft and the second end of the hollow core shaft; and a tight-fit component, sleeved over an outer circumferential wall surface of the first end of the hollow core shaft in a tight-fit manner and tightly fit with an end surface of the first end of the hollow connecting shaft, so that the hollow connecting shaft and the hollow core shaft corotate coaxially under a friction between the tight-fit component and the hollow connecting shaft and a friction between the tight-fit component and the hollow core shaft.

When an external force drives the outer wheel to rotate, the outer wheel rotates relative to the hollow connecting shaft in the first relative rotation direction, and drives, through the clutch wheel, the hollow connecting shaft to rotate synchronously, and the hollow connecting shaft drives, through the tight-fit component, the hollow core shaft to rotate; and if the friction provided by the tight-fit component is insufficient to drive the hollow core shaft to rotate at this time, the second end of the hollow connecting shaft presses the elastic element, and while being pressed, the elastic element pushes the second end of the hollow core shaft, thereby driving the hollow core shaft to rotate. When the external force decreases or stops driving the outer wheel to rotate, the hollow core shaft continues to rotate due to inertia, and drives, through the tight-fit component, the hollow connecting shaft to rotate relative to the outer wheel in the second relative rotation direction; and if the friction provided by the tight-fit component is insufficient to drive the hollow connecting shaft to rotate at this time, the hollow core shaft stretches the elastic element, and while being stretched, the elastic element pulls the second end of the hollow connecting shaft, thereby driving the hollow connecting shaft to rotate relative to the outer wheel in the second relative rotation direction, so that the hollow connecting shaft is disassociated from the co-rotational relationship with the outer wheel, and idles in the clutch wheel.

According to another preferred embodiment of the present invention, the tight-fit component is a C-shaped retaining ring.

According to another preferred embodiment of the present invention, the second end of the hollow connecting shaft is provided with a first protruding portion, and the second end of the hollow core shaft is provided with a corresponding second protruding portion; the number of one of the first protruding portion and the second protruding portion is at least one, and the number of the other of the first protruding portion and the second protruding portion is at least two; and when a rotation angle of the hollow connecting shaft relative to the hollow core shaft exceeds a predetermined value, the first protruding portion of the hollow connecting shaft contacts the second protruding portion of the hollow core shaft, thereby stopping relative rotation between the hollow connecting shaft and the hollow core shaft, and setting the hollow connecting shaft and the hollow core shaft in a synchronous co-rotational relationship.

According to another preferred embodiment of the present invention, a first ball bearing is sleeved over the first end of the hollow core shaft, a second ball bearing is sleeved over the second end of the hollow core shaft, and the first ball bearing and the second ball bearing are disposed between the hollow core shaft and the outer wheel, so that the hollow core shaft is rotatable relative to the outer wheel.

According to another preferred embodiment of the present invention, three grooves are provided in a concave manner on an inner circumferential wall surface of the outer wheel, and an anaerobic adhesive is coated in the grooves, so that the clutch wheel, the first ball bearing, and the second ball bearing are separately tightly fit in the grooves, and are fixedly glued in the outer wheel by using the anaerobic adhesive.

According to another preferred embodiment of the present invention, a positioning casing is further sleeved over the first ball bearing, and an axial position of the pulley on the alternator is limited by the positioning casing.

According to another preferred embodiment of the present invention, an outer circumferential wall surface of the outer wheel is provided with a belt groove, for a belt to be wound on.

According to another preferred embodiment of the present invention, the belt is connected to a mechanical energy generating source, and the mechanical energy generating source provides an external force to drive the belt, thereby driving the outer wheel to rotate.

According to another preferred embodiment of the present invention, the mechanical energy generating source is an engine.

According to another preferred embodiment of the present invention, an inner circumferential wall surface of the hollow core shaft is provided with a threaded surface, the threaded surface is screwed with a joint lever having corresponding threads, and the joint lever is connected to a rotor, so that the hollow core shaft and the rotor corotate synchronously.

According to another preferred embodiment of the present invention, an inner circumferential wall surface of the outer wheel is provided with a step portion, for the clutch wheel to abut against, thereby limiting an axial displacement of the clutch wheel.

According to another preferred embodiment of the present invention, one end of the clutch wheel is provided with a positioning member, to limit an axial position of the clutch wheel, and the positioning member is a C-shaped retaining ring.

According to another preferred embodiment of the present invention, the elastic element is a torque spring, and a wire profile of the torque spring is circular, elliptical, or rectangular.

According to another preferred embodiment of the present invention, when the wire profile of the torque spring is rectangular, two end surfaces of the torque spring are grinded, so as to enhance axial positioning of the torque spring and control a free length of the torque spring more precisely.

According to another preferred embodiment of the present invention, two sides of the clutch wheel are each provided with an oil seal element, so as to prevent liquid in the clutch wheel from flowing into the outer wheel.

According to another preferred embodiment of the present invention, one side of one of the oil seal elements is provided with a positioning member, and the positioning member is sleeved over an inner side wall surface of the outer wheel in a tight-fit manner, to limit axial positions of the oil seal elements.

According to another preferred embodiment of the present invention, the positioning member is a C-shaped retaining ring.

According to another preferred embodiment of the present invention, an end, corresponding to the second end of the hollow core shaft, of the outer wheel is arranged with a dust cover, so as to prevent external dust from entering the outer wheel.

The present invention further provides a pulley for an alternator, which includes an outer wheel, provided with an axle hole at the center; a clutch wheel, fixedly disposed in the axle hole of the outer wheel and having a pivot hole; a hollow connecting shaft, having a first end and a second end, where the first end is rotatably disposed in the pivot hole of the clutch wheel, so that the hollow connecting shaft maintains a co-rotational relationship with the outer wheel in a first relative rotation direction by means of the clutch wheel, while in a second relative rotation direction, the hollow connecting shaft is disassociated from the co-rotational relationship with the outer wheel, and presents an idling state; and the second end of the hollow connecting shaft is provided with a first protruding portion; a hollow core shaft, having a first end and a second end, where the hollow core shaft is rotatably received in the outer wheel, and the second end of the hollow core shaft is rotatably arranged at the second end of the hollow connecting shaft; the second end of the hollow core shaft is provided with a second protruding portion, and the second protruding portion corresponds to the first protruding portion; the number of one of the first protruding portion and the second protruding portion is at least one, and the number of the other of the first protruding portion and the second protruding portion is at least two; and an elastic element, disposed between the second end of the hollow connecting shaft and the second end of the hollow core shaft.

When an external force drives the outer wheel to rotate, the outer wheel rotates relative to the hollow connecting shaft in the first relative rotation direction, and drives, through the clutch wheel, the hollow connecting shaft to rotate synchronously; the second end of the hollow connecting shaft presses the elastic element, and while being pressed, the elastic element pushes the second end of the hollow core shaft, thereby driving the hollow core shaft to rotate; and if a rotation angle of the hollow connecting shaft relative to the hollow core shaft exceeds a predetermined value at this time, the first protruding portion of the hollow connecting shaft contacts the second protruding portion of the hollow core shaft, thereby stopping relative rotation between the hollow connecting shaft and the hollow core shaft, so as to prevent the elastic element from being pressed excessively, and to set the hollow connecting shaft and the hollow core shaft in a synchronous co-rotational relationship. When the external force decreases or stops driving the outer wheel to rotate, the hollow core shaft continues to rotate due to inertia, and stretches the elastic element, and while being stretched, the elastic element pulls the second end of the hollow connecting shaft, thereby driving the hollow connecting shaft to rotate relative to the outer wheel in the second relative rotation direction, so that the hollow connecting shaft is disassociated from the co-rotational relationship with the outer wheel, and idles in the clutch wheel; and if a rotation angle of the hollow connecting shaft relative to the hollow core shaft exceeds a predetermined value at this time, the first protruding portion of the hollow connecting shaft contacts the second protruding portion of the hollow core shaft, thereby stopping relative rotation between the hollow connecting shaft and the hollow core shaft, so as to prevent the elastic element from being stretched excessively, and to set the hollow connecting shaft and the hollow core shaft in a synchronous co-rotational relationship.

According to another preferred embodiment of the present invention, the hollow core shaft passes through the hollow connecting shaft, and the first end of the hollow core shaft protrudes from the first end of the hollow connecting shaft; a tight-fit component is sleeved over an outer circumferential wall surface of the first end of the hollow core shaft in a tight-fit manner, and the tight-fit component is also tightly fit with an end surface of the first end of the hollow connecting shaft; therefore, the hollow connecting shaft and the hollow core shaft are made to corotate coaxially under a friction between the tight-fit component and the hollow connecting shaft and a friction between the tight-fit component and the hollow core shaft, and when the external force decreases or stops driving the outer wheel to rotate, the hollow core shaft continues to rotate due to inertia, and drives, through the tight-fit component, the hollow connecting shaft to rotate relative to the outer wheel in the second relative rotation direction, so that the hollow connecting shaft is disassociated from the co-rotational relationship with the outer wheel and idles in the clutch wheel.

According to another preferred embodiment of the present invention, the tight-fit component is a C-shaped retaining ring.

According to another preferred embodiment of the present invention, a first ball bearing is sleeved over the first end of the hollow core shaft, a second ball bearing is sleeved over the second end of the hollow core shaft, and the first ball bearing and the second ball bearing are disposed between the hollow core shaft and the outer wheel, so that the hollow core shaft is rotatable relative to the outer wheel.

According to another preferred embodiment of the present invention, three grooves are provided in a concave manner on an inner circumferential wall surface of the outer wheel, and an anaerobic adhesive is coated in the grooves, so that the clutch wheel, the first ball bearing, and the second ball bearing are separately tightly fit in the grooves, and are fixedly glued in the outer wheel by using the anaerobic adhesive.

According to another preferred embodiment of the present invention, a positioning casing is further sleeved over the first ball bearing, and an axial position of the pulley on the alternator is limited by the positioning casing.

According to another preferred embodiment of the present invention, an outer circumferential wall surface of the outer wheel is provided with a belt groove, for a belt to be wound on.

According to another preferred embodiment of the present invention, the belt is connected to a mechanical energy generating source, and the mechanical energy generating source provides an external force to drive the belt, thereby driving the outer wheel to rotate.

According to another preferred embodiment of the present invention, the mechanical energy generating source is an engine.

According to another preferred embodiment of the present invention, an inner circumferential wall surface of the hollow core shaft is provided with a threaded surface, the threaded surface is screwed with a joint lever having corresponding threads, and the joint lever is connected to a rotor, so that the hollow core shaft and the rotor corotate synchronously.

According to another preferred embodiment of the present invention, an inner circumferential wall surface of the outer wheel is provided with a step portion, for the clutch wheel to abut against, thereby limiting an axial displacement of the clutch wheel.

According to another preferred embodiment of the present invention, one end of the clutch wheel is provided with a positioning member, to limit an axial position of the clutch wheel, and the positioning member is a C-shaped retaining ring.

According to another preferred embodiment of the present invention, the elastic element is a torque spring, and a wire profile of the torque spring is circular, elliptical, or rectangular.

According to another preferred embodiment of the present invention, when the wire profile of the torque spring is rectangular, two end surfaces of the torque spring are grinded, so as to enhance axial positioning of the torque spring and control a free length of the torque spring more precisely.

According to another preferred embodiment of the present invention, two sides of the clutch wheel are each provided with an oil seal element, so as to prevent liquid in the clutch wheel from flowing into the outer wheel.

According to another preferred embodiment of the present invention, one side of one of the oil seal elements is provided with a positioning member, and the positioning member is sleeved over an inner side wall surface of the outer wheel in a tight-fit manner, to limit axial positions of the oil seal elements.

According to another preferred embodiment of the present invention, the positioning member is a C-shaped retaining ring.

According to another preferred embodiment of the present invention, an end, corresponding to the second end of the hollow core shaft, of the outer wheel is arranged with a dust cover, so as to prevent external dust from entering the outer wheel.

The present invention further provides a pulley for an alternator, which includes an outer wheel, provided with an axle hole at the center; a clutch wheel, fixedly disposed in the axle hole of the outer wheel and having a pivot hole; a hollow connecting shaft, having a first end and a second end, where the first end is rotatably disposed in the pivot hole of the clutch wheel, so that the hollow connecting shaft maintains a co-rotational relationship with the outer wheel in a first relative rotation direction by means of the clutch wheel, while in a second relative rotation direction, the hollow connecting shaft is disassociated from the co-rotational relationship with the outer wheel, and presents an idling state; and the second end of the hollow connecting shaft is provided with a first protruding portion; a hollow core shaft, having a first end and a second end, where the hollow core shaft is rotatably received in the outer wheel, and the hollow core shaft passes through the hollow connecting shaft; the first end of the hollow core shaft protrudes from the first end of the hollow connecting shaft, and the second end of the hollow core shaft is rotatably arranged on the second end of the hollow connecting shaft; the second end of the hollow core shaft is provided with a second protruding portion, and the second protruding portion corresponds to the first protruding portion; the number of one of the first protruding portion and the second protruding portion is at least one, and the number of the other of the first protruding portion and the second protruding portion is at least two; an elastic element, disposed between the second end of the hollow connecting shaft and the second end of the hollow core shaft; and a tight-fit component, sleeved over an outer circumferential wall surface of the first end of the hollow core shaft in a tight-fit manner and tightly fit with an end surface of the first end of the hollow connecting shaft, so that the hollow connecting shaft and the hollow core shaft corotate coaxially under a friction between the tight-fit component and the hollow connecting shaft and a friction between the tight-fit component and the hollow core shaft.

When an external force drives the outer wheel to rotate, the outer wheel rotates relative to the hollow connecting shaft in the first relative rotation direction, and drives, through the clutch wheel, the hollow connecting shaft to rotate synchronously, and the hollow connecting shaft drives, through the tight-fit component, the hollow core shaft to rotate; if the friction provided by the tight-fit component is insufficient to drive the hollow core shaft to rotate at this time, the second end of the hollow connecting shaft presses the elastic element, and while being pressed, the elastic element pushes the second end of the hollow core shaft, thereby driving the hollow core shaft to rotate; and if a rotation angle of the hollow connecting shaft relative to the hollow core shaft exceeds a predetermined value at this time, the first protruding portion of the hollow connecting shaft contacts the second protruding portion of the hollow core shaft, thereby stopping relative rotation between the hollow connecting shaft and the hollow core shaft, so as to prevent the elastic element from being pressed excessively, and to set the hollow connecting shaft and the hollow core shaft in a synchronous co-rotational relationship. When the external force decreases or stops driving the outer wheel to rotate, the hollow core shaft continues to rotate due to inertia, and drives, through the tight-fit component, the hollow connecting shaft to rotate relative to the outer wheel in the second relative rotation direction; and if the friction provided by the tight-fit component is insufficient to drive the hollow connecting shaft to rotate at this time, the hollow core shaft rotates relative to the hollow connecting shaft until the first protruding portion of the hollow connecting shaft contacts the second protruding portion of the hollow core shaft, thereby stopping relative rotation between the hollow connecting shaft and the hollow core shaft, and setting the hollow connecting shaft and the hollow core shaft in a synchronous co-rotational relationship.

According to another preferred embodiment of the present invention, when the external force decreases or stops driving the outer wheel to rotate, the hollow core shaft continues to rotate due to inertia, and drives, through the tight-fit component, the hollow connecting shaft to rotate relative to the outer wheel in the second relative rotation direction; if the friction provided by the tight-fit component is insufficient to drive the hollow connecting shaft to rotate at this time, the hollow core shaft stretches the elastic element, and while being stretched, the elastic element pulls the second end of the hollow connecting shaft, thereby driving the hollow connecting shaft to rotate relative to the outer wheel in the second relative rotation direction, so that the hollow connecting shaft is disassociated from the co-rotational relationship with the outer wheel; and if a rotation angle of the hollow connecting shaft relative to the hollow core shaft exceeds a predetermined value, the protruding portion of the hollow connecting shaft contacts the protruding portion of the hollow core shaft, thereby stopping relative rotation between the hollow connecting shaft and the hollow core shaft, so as to prevent the elastic element from being stretched excessively, and to set the hollow connecting shaft and the hollow core shaft in a synchronous co-rotational relationship.

According to another preferred embodiment of the present invention, the tight-fit component is a C-shaped retaining ring.

According to another preferred embodiment of the present invention, a first ball bearing is sleeved over the first end of the hollow core shaft, a second ball bearing is sleeved over the second end of the hollow core shaft, and the first ball bearing and the second ball bearing are disposed between the hollow core shaft and the outer wheel, so that the hollow core shaft is rotatable relative to the outer wheel.

According to another preferred embodiment of the present invention, three grooves are provided in a concave manner on an inner circumferential wall surface of the outer wheel, and an anaerobic adhesive is coated in the grooves, so that the clutch wheel, the first ball bearing, and the second ball bearing are separately tightly fit in the grooves, and are fixedly glued in the outer wheel by using the anaerobic adhesive.

According to another preferred embodiment of the present invention, a positioning casing is further sleeved over the first ball bearing, and an axial position of the pulley on the alternator is limited by the positioning casing.

According to another preferred embodiment of the present invention, an outer circumferential wall surface of the outer wheel is provided with a belt groove, for a belt to be wound on.

According to another preferred embodiment of the present invention, the belt is connected to a mechanical energy generating source, and the mechanical energy generating source provides an external force to drive the belt, thereby driving the outer wheel to rotate.

According to another preferred embodiment of the present invention, the mechanical energy generating source is an engine.

According to another preferred embodiment of the present invention, an inner circumferential wall surface of the hollow core shaft is provided with a threaded surface, the threaded surface is screwed with a joint lever having corresponding threads, and the joint lever is connected to a rotor, so that the hollow core shaft and the rotor corotate synchronously.

According to another preferred embodiment of the present invention, an inner circumferential wall surface of the outer wheel is provided with a step portion, for the clutch wheel to abut against, thereby limiting an axial displacement of the clutch wheel.

According to another preferred embodiment of the present invention, one end of the clutch wheel is provided with a positioning member, to limit an axial position of the clutch wheel, and the positioning member is a C-shaped retaining ring.

According to another preferred embodiment of the present invention, the elastic element is a torque spring, and a wire profile of the torque spring is circular, elliptical, or rectangular.

According to another preferred embodiment of the present invention, when the wire profile of the torque spring is rectangular, two end surfaces of the torque spring are grinded, so as to enhance axial positioning of the torque spring and control a free length of the torque spring more precisely.

According to another preferred embodiment of the present invention, two sides of the clutch wheel are each provided with an oil seal element, so as to prevent liquid in the clutch wheel from flowing into the outer wheel.

According to another preferred embodiment of the present invention, one side of one of the oil seal elements is provided with a positioning member, and the positioning member is sleeved over an inner side wall surface of the outer wheel in a tight-fit manner, to limit axial positions of the oil seal elements.

According to another preferred embodiment of the present invention, the positioning member is a C-shaped retaining ring.

According to another preferred embodiment of the present invention, an end, corresponding to the second end of the hollow core shaft, of the outer wheel is arranged with a dust cover, so as to prevent external dust from entering the outer wheel.

The present invention further provides an alternator having the pulley according to the present invention.

According to another preferred embodiment of the present invention, the alternator is used on a vehicle.

For better understanding of the detailed description of the present invention, the features and technical advantages of the present invention are described generally above. The following describes the additional features and advantages of the present invention. Persons skilled in the art should be aware that the disclosed concept and specific implementation manner can be easily used as a basis for modifying or designing other structures for implementing objectives the same as the present invention. Persons skilled in the art should also be aware that such equivalent structures do not depart from the spirit and scope of the present invention which are claimed in the patent application scope.

BRIEF DESCRIPTION OF THE DRAWINGS

For a more thorough understanding of the present invention and advantages of the present invention, the following descriptions are provided with reference to the accompanying drawings, where.

MEANING OF REFERENCE NUMERALS

10 Pulley
20 Joint lever
30 Rotor
110 Outer wheel
111 Axle hole
112 Belt groove
113 Step portion
120 Clutch wheel
121 Pivot hole
122 Housing
123 Rolling member
124 Elastic member
125 Cap
130 Hollow connecting shaft
131 First end of the hollow connecting shaft
132 Second end of the hollow connecting shaft
133 First protruding portion
134 Stop wall of the hollow connecting shaft
140 Hollow core shaft
141 First end of the hollow core shaft
142 Second end of the hollow core shaft
143 First ball bearing
144 Second ball bearing
145 Protruding ring of the hollow core shaft
146 Second protruding portion
147 Stop wall of the hollow core shaft
148 Threaded surface
150 Elastic element
160 Tight-fit component
161 Positioning gasket
162 C-shaped retaining ring
170 Positioning casing
171 Protruding ring of the positioning casing
181 Oil seal element
182 Oil seal element
183 Positioning member
184 Dust cover
185 Positioning member

DETAILED DESCRIPTION OF EXEMPLARY EMBODIMENTS

The following embodiments describe the present invention in further detail. The embodiments are merely used to describe the present invention and illustrate the advantages of specific embodiments of the present invention, but it does not mean that the present invention is limited to such implementations.

Figure 1:
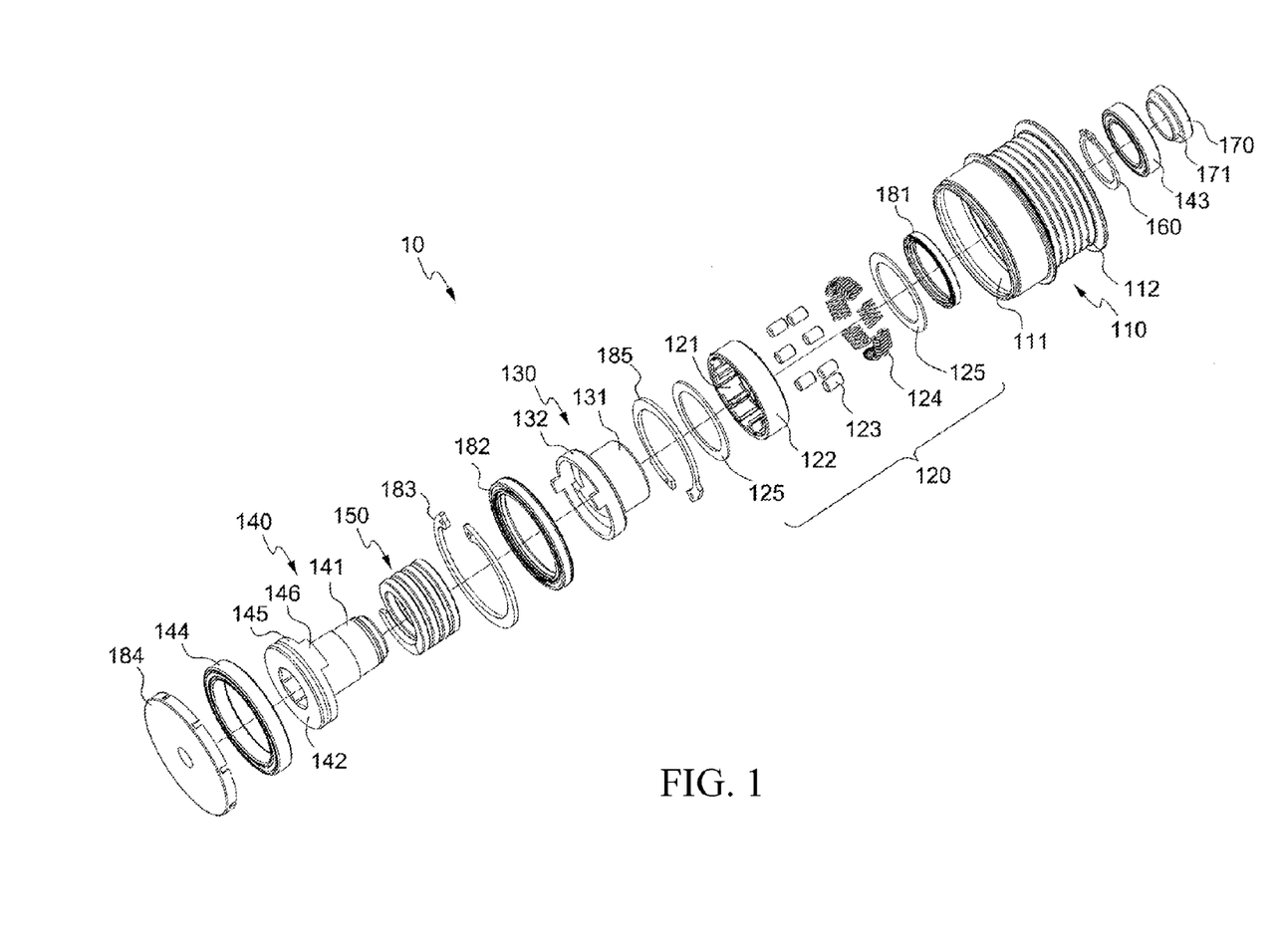
FIG. 1 is a three-dimensional exploded view of a pulley for an alternator according to the present invention.
Figure 2:
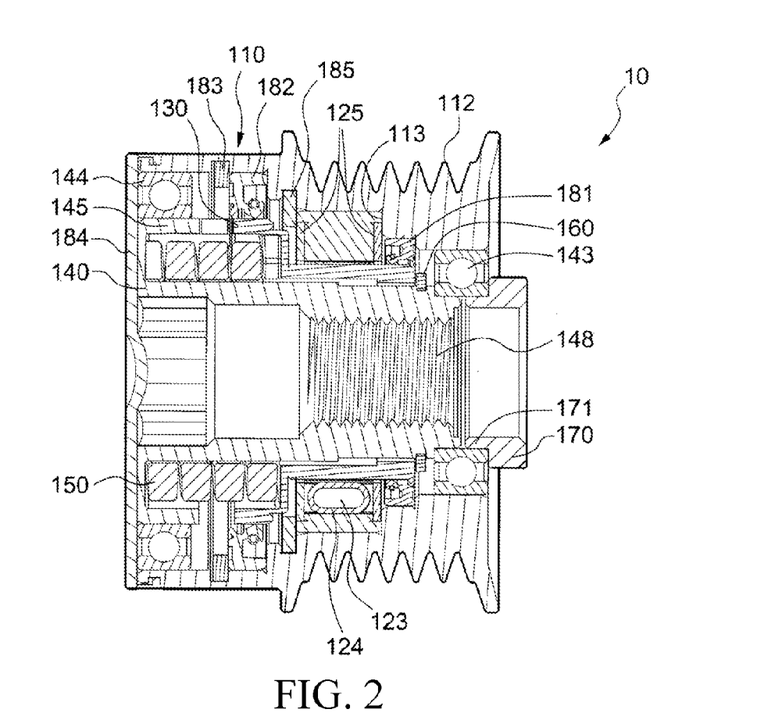
FIG. 2 is a sectional assembled view of a pulley for an alternator according to the present invention.

FIG. 1 and FIG. 2 are respectively a three-dimensional exploded view and a sectional assembled view of a pulley for an alternator according to the present invention. As shown in FIG. 1 and FIG. 2, a pulley 10 for an alternator according to the present invention mainly includes an outer wheel 110, a clutch wheel 120, a hollow connecting shaft 130, a hollow core shaft 140, an elastic element 150, and a tight-fit component 160. The outer wheel 110 is a wheel-shaped member provided with an axle hole 111 at the center, and is provided with a belt groove 112 on an outer circumferential wall surface thereof and a step portion 113 on an inner circumferential wall surface thereof. The clutch wheel 120 is annular, provided with a pivot hole 121 at the center, and fixedly disposed in the axle hole 111 of the outer wheel 110. For example, a groove may be provided in a concave manner on the inner circumferential wall surface of the outer wheel 110, and an anaerobic adhesive is coated in the groove so that the clutch wheel 120 can be fixedly connected to an inner circumferential wall surface of the axle hole 111 of the outer wheel 110 by means of tight fit and adhesion of the anaerobic adhesive. One end of the clutch wheel 120 abuts against the step portion 113 of the outer wheel 110 to limit an axial position of the clutch wheel 120 and to ensure that an end surface of the clutch wheel 120 is perpendicular to the hollow connecting shaft 130 and the hollow core shaft 140, prevent axial displacement of the clutch wheel 120 during high-speed rotation, and moreover, provide an axial positioning reference during assembly of components in the outer wheel 110, which facilitates positioning during the assembly.

Figure 3:
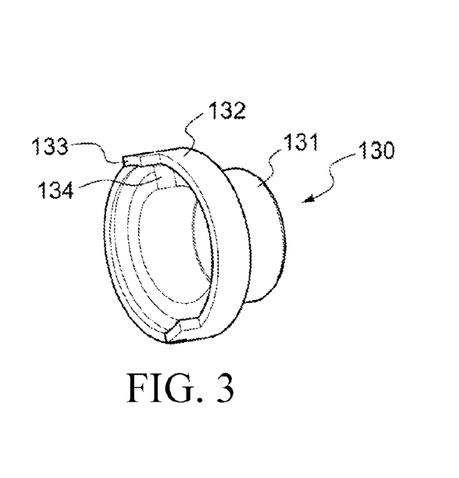
FIG. 3 is a schematic structural view of a hollow connecting shaft according to the present invention.

The hollow connecting shaft 130 has a first end 131 and a second end 132. The first end 131 is rotatably disposed in the clutch wheel 120 so that the hollow connecting shaft 130 can maintain a co-rotational relationship with the outer wheel 110 in a first relative rotation direction by means of the clutch wheel 120 (for example, the hollow connecting shaft 130 rotates anticlockwise relative to the outer wheel 110), and it is disassociated from the co-rotational relationship with the outer wheel 110 in a second relative rotation direction to enter an idling state (for example, the hollow connecting shaft 130 rotates clockwise relative to the outer wheel 110), and at this time, the hollow connecting shaft 130 rotates independently of the outer wheel 110. The hollow connecting shaft 130 is provided with a first protruding portion 133 on the second end 132, as shown in FIG. 3.

In a preferred embodiment of the present invention, the clutch wheel 120 has a housing 122, a plurality of rolling members 123, a plurality of elastic members 124, and two caps 125. The clutch wheel 120 is provided with a positioning member 185 on an end opposite to the end abutting against the step portion 113 to limit the axial position of the clutch wheel 120 and prevent the caps 125 of the clutch wheel 120 from falling off. The positioning member may be a C-shaped retaining ring. For the detailed structure and operating principle of the clutch wheel 120, reference may be made to Taiwan Patent Application No. 098129945 filed by the applicant on Sep. 4, 2009. However, the clutch wheel of the present invention is not limited thereto, and any speed-difference clutch apparatus capable of implementing the functions of the clutch wheel 120 described in the present invention may be designed as the clutch wheel 120 of the present invention. Moreover, in the present invention, two ends of the clutch wheel 120 are each provided with an oil seal element 181/182 so as to prevent a liquid (for example, a lubricating oil) in the clutch wheel 120 from permeating and polluting the interior of the pulley 10. Furthermore, a positioning member 183 may be sleeved over one side of the oil seal element 182. The positioning member 183 may be a C-shaped retaining ring, and may be sleeved over an inner side wall surface of the outer wheel 110 in a tight-fit manner, to limit axial positions of the oil seal elements 181 and 182 and the clutch wheel 120.

The hollow core shaft 140 is disposed in the outer wheel 110 and has a first end 141 and a second end 142. A first ball bearing 143 is sleeved over the first end 141, and a second ball bearing 144 is sleeved over the second end 142. The first ball bearing 143 and the second ball bearing 144 are both fixedly connected to the inner circumferential wall surface of the outer wheel 110 (for example, the outer wheel 110 may be provided with two grooves on the inner circumferential wall surface in a concave manner, and an anaerobic adhesive is coated in the grooves so that the first ball bearing 143 and the second ball bearing 144 can be fixedly connected to the inner circumferential wall surface of the axle hole 111 of the outer wheel 110 by means of tight fit and adhesion of the anaerobic adhesive) so that the hollow core shaft 140 is rotatable relative to the outer wheel 110. In addition, the hollow core shaft 140 passes through the hollow connecting shaft 130, and the first end 141 of the hollow core shaft 140 protrudes from the first end 131 of the hollow connecting shaft 130. A protruding ring 145 is annularly arranged at the second end 142 of the hollow core shaft 140. The protruding ring 145 is rotatably arranged on the second end 132 of the hollow connecting shaft 130. A second protruding portion 146 is provided in a protruding manner in a direction towards the hollow connecting shaft 130, and the second protruding portion 146 corresponds to the first protruding portion 133 so that after the hollow connecting shaft 130 and the hollow core shaft 140 rotate by a particular degree relative to each other, the first protruding portion 133 of the hollow connecting shaft 130 contacts the second protruding portion 146 of the hollow core shaft 140, thereby stopping relative rotation between the hollow connecting shaft 130 and the hollow core shaft 140. For example, when the hollow connecting shaft 130 is provided with two first protruding portions 133 at the second end 132, and when the hollow core shaft 140 is provided with three second protruding portions 146 at the second end 142, the hollow core shaft 140 can only rotate clockwise or anticlockwise by 120 degrees relative to the hollow connecting shaft 130 after being sleeved over the hollow connecting shaft 130 because relative rotation between the hollow connecting shaft 130 and the hollow core shaft 140 is stopped when the first protruding portions 133 contact the second protruding portions 146.

Figure 4:
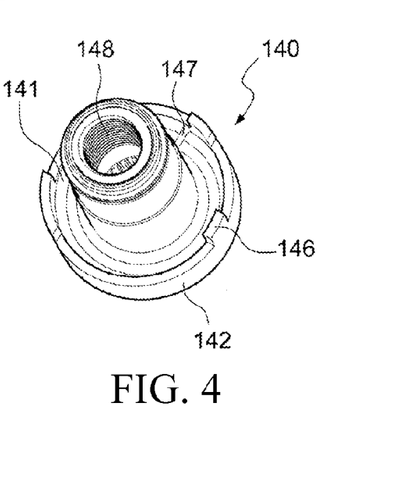
FIG. 4 is a schematic structural view of a hollow core shaft according to the present invention.

The elastic element 150 is disposed between the second end 132 of the hollow connecting shaft 130 and the second end 142 of the hollow core shaft 140. In a preferred embodiment of the present invention, the elastic element is a torque spring, and a wire profile of the torque spring may be circular, elliptical, or rectangular. When the wire profile of the torque spring is rectangular, two end surfaces of the torque spring may be grinded so as to enhance an axial positioning capability of the torque spring and control a free length of the spring more precisely. The hollow connecting shaft 130 is provided with a stop wall 134 in a concave manner on an inner circumferential wall surface of the second end 132 (as shown in FIG. 3) so that one end of the elastic element 150 can abut against the stop wall 134, and the elastic element 150 may also be fixedly connected to the stop wall 134. In addition, The hollow core shaft 140 is also provided with a stop wall 147 on an inner side of the protruding ring 145 of the second end 142 (as shown in FIG. 4) so that the other end of the elastic element 150 can abut against the stop wall 147, and the elastic element 150 may also be fixedly connected to the stop wall 147. When the two ends of the elastic element 150 are fixedly connected to the stop wall 134 of the hollow connecting shaft 130 and the stop wall 147 of the hollow core shaft 140, relative rotation between the hollow connecting shaft 130 and the hollow core shaft 140 presses or stretches the elastic element 150; when the two ends of the elastic element 150 merely abut against but are not fixedly connected to the stop wall 134 of the hollow connecting shaft 130 or the stop wall 147 of the hollow core shaft 140, relative rotation between the hollow connecting shaft 130 and the hollow core shaft 140 only presses the elastic element 150.

The tight-fit component 160 is a C-shaped retaining ring; the C-shaped retaining ring is sleeved over the outer circumferential wall surface of the first end 141 of the hollow core shaft 140 in a tight-fit manner, and is tightly fit with a tail end surface of the first end 131 of the hollow connecting shaft 130. Therefore, under a friction between the tight-fit component 160 and the end surface of the first end 131 of the hollow connecting shaft 130 and a friction between the tight-fit component 160 and the outer circumferential wall surface of the first end 141 of the hollow core shaft 140, the hollow connecting shaft 130 and the hollow core shaft 140 drive each other and corotate coaxially, as shown in FIG. 3.

A positioning casing 170 is further sleeved over the first ball bearing 143, and the positioning casing 170 is a hollow annular pipe provided with a protruding ring 171 at one end; therefore, the protruding ring 171 penetrates the first ball bearing 143 and provides an abutting and cushioning function when the pulley 10 is installed on an alternator, and an axial position of the pulley 10 on the alternator is limited by the positioning casing 170.

Figure 5:
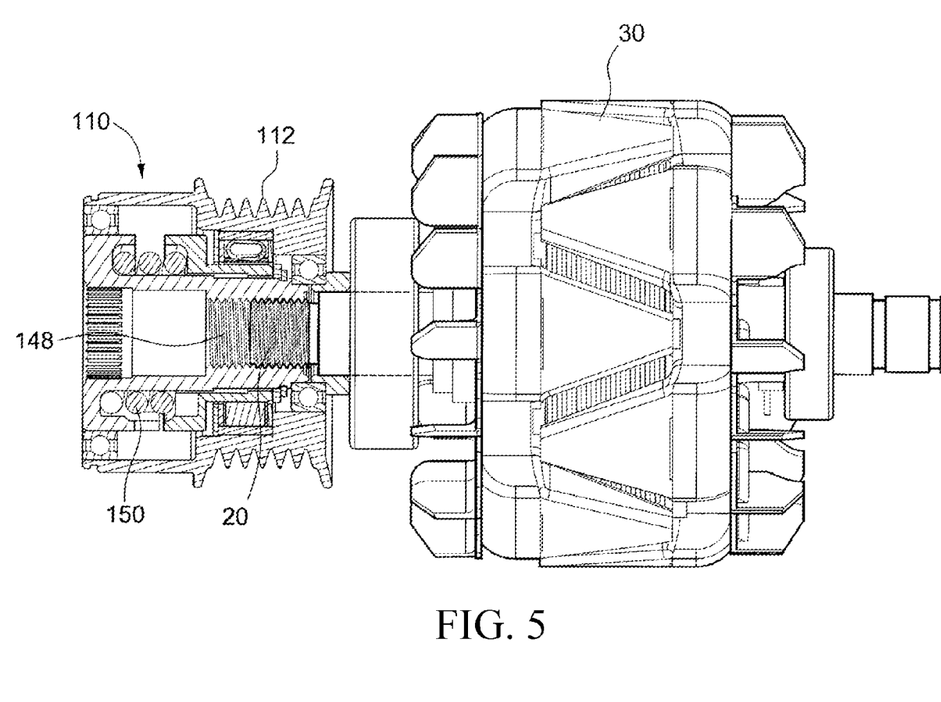
FIG. 5 is a schematic view of a rotor of an alternator according to the present invention.

The hollow core shaft 140 is provided with a threaded surface 148 on an inner circumferential wall surface thereof, the threaded surface 148 may be screwed with a joint lever 20 having corresponding threads, and the joint lever 20 is connected to a rotor 30 of the alternator so that the hollow core shaft 140 and the rotor 30 corotate synchronously (as shown in FIG. 5). In addition, an end, corresponding to the second end 142 of the hollow core shaft 140, of the outer wheel 110 is arranged with a dust cover 184 so as to prevent external dust from entering the outer wheel 110.

With the structure described above, when a mechanical energy generating source provides an external force to drive the outer wheel 110 to rotate, the outer wheel 110 rotates relative to the hollow connecting shaft 130 in the first relative rotation direction and drives, through the clutch wheel 120, the hollow connecting shaft 130 to rotate synchronously, and with the friction provided by the tight-fit component 160, the hollow connecting shaft 130 drives the hollow core shaft 140 to rotate. At this time, if the friction provided by the tight-fit component 160 is insufficient to drive the hollow core shaft 140 to rotate, the hollow connecting shaft 130 rotates relative to the hollow core shaft 140, which causes the stop wall 134 at the second end 132 of the hollow connecting shaft 130 to press the elastic element 150, and while being pressed, the elastic element 150 pushes the stop wall 147 at the second end 142 of the hollow core shaft 140, thereby driving the hollow core shaft 140 to rotate. At this time, if a relative rotation angle between the hollow connecting shaft 130 and the hollow core shaft 140 exceeds a predetermined value (for example, 120 degrees), the first protruding portion 133 of the hollow connecting shaft 130 contacts the second protruding portion 146 of the hollow core shaft 140, thereby stopping relative rotation between the hollow connecting shaft 130 and the hollow core shaft 140 so as to avoid pressing the elastic element 150 excessively and damaging the structure thereof, and to set the hollow connecting shaft 130 and the hollow core shaft 140 in a synchronous co-rotational relationship; the hollow core shaft 140 also drives the rotor 30 to rotate so that the alternator generates an induced current.

In addition, if the outer wheel 110 is originally in a rotation state, when the mechanical energy generating source provides an external force to accelerate the rotation of the outer wheel 110, an operating principle of the pulley 10 of the present invention is substantially the same as the aforementioned operating principle in the case of starting the outer wheel 110 to rotate, and therefore it is not repeated herein.

On the contrary, when the external force stops driving the outer wheel 110 to rotate, the hollow core shaft 140 continues to rotate due to inertia of the rotor 30. At this time, the hollow core shaft 140 drives, by using the friction provided by the tight-fit component 160, the hollow connecting shaft 130 to rotate relative to the outer wheel 110 in the second relative rotation direction so that the hollow connecting shaft 130 is disassociated from the co-rotational relationship with the outer wheel 110. At this time, if the friction provided by the tight-fit component 160 is insufficient to drive the hollow connecting shaft 130 to rotate, the hollow core shaft 140 rotates relative to the hollow connecting shaft 130; if the elastic element 150 merely abuts against but is not fixedly connected to the hollow connecting shaft 130 and the hollow core shaft 140, the hollow core shaft 140 keeps rotating relative to the hollow connecting shaft 130 until the second protruding portion 146 of the hollow core shaft 140 contacts the first protruding portion 133 of the hollow connecting shaft 130, thereby stopping relative rotation between the hollow connecting shaft 130 and the hollow core shaft 140 and setting the hollow connecting shaft 130 and the hollow core shaft 140 in a synchronous co-rotational relationship so that the hollow connecting shaft 130 and the hollow core shaft 140 rotate relative to the outer wheel 110 in the second relative rotation direction.

If the elastic element 150 is fixedly connected to the hollow connecting shaft 130 and the hollow core shaft 140, when the friction provided by the tight-fit component 160 is insufficient to drive the hollow connecting shaft 130 to rotate, the hollow core shaft 140 rotates relative to the hollow connecting shaft 130 and stretches the elastic element 150, and while being stretched, the elastic element 150 pulls the second end 132 of the hollow connecting shaft 130, thereby driving the hollow connecting shaft 130 to rotate relative to the outer wheel 110 in the second relative rotation direction so that the hollow connecting shaft 130 is disassociated from the co-rotational relationship with the outer wheel 110. At this time, if rotation of the hollow connecting shaft 130 relative to the hollow core shaft 140 exceeds a predetermined value (for example, 120 degrees), the first protruding portion 133 of the hollow connecting shaft 130 contacts the second protruding portion 146 of the hollow core shaft 140, thereby stopping relative rotation between the hollow connecting shaft 130 and the hollow core shaft 140 so as to avoid stretching the elastic element 150 excessively and damaging the structure thereof, and to set the hollow connecting shaft 130 and the hollow core shaft 140 in a synchronous co-rotational relationship so that the hollow connecting shaft 130 and the hollow core shaft 140 rotate relative to the outer wheel 110 in the second relative rotation direction.

In addition, if the external force driving the outer wheel 110 decreases, the operating principle of the pulley 10 of the present invention is substantially the same as the aforementioned operating principle in the case in which the outer wheel 110 stops rotating, and therefore it is not repeated herein.

In the pulley 10 of the present invention, a belt (not shown in the figure) may be wound on the belt groove 112 of the outer wheel 110 so that the mechanical energy generating source can provide an external force to drive the belt, thereby driving the outer wheel 110 to rotate. In addition, the pulley 10 of the present invention is applicable to an alternator system, such as a power generation system and an alternator system of a vehicle. The pulley of the present invention is especially suitable to be used as a stator structure of an automotive alternator. When the pulley of the present invention is applied to an automotive alternator, the mechanical energy generating source is an automobile engine.

In a preferred embodiment of the present invention, the tight-fit component 160 of the pulley 10 of the present invention may be omitted, and two ends of the elastic element 150 are fixedly connected to the stop wall 147 at the second end 142 of the hollow core shaft 140 and the stop wall 134 at the second end 132 of the hollow connecting shaft 130. In this manner, when an external force drives the outer wheel 110 to rotate, the outer wheel 110 rotates relative to the hollow connecting shaft 130 in the first relative rotation direction and drives, through the clutch wheel 120, the hollow connecting shaft 130 to rotate synchronously; the second end 132 of the hollow connecting shaft 130 presses the elastic element 150, and while being pressed, the elastic element 150 pushes the stop wall 147 at the second end 142 of the hollow core shaft 140, thereby driving the hollow core shaft 140 to rotate. At this time, if a rotation angle of the hollow connecting shaft 130 relative to the hollow core shaft 140 exceeds a predetermined value, the first protruding portion 133 of the hollow connecting shaft 130 contacts the second protruding portion 146 of the hollow core shaft 140, thereby stopping relative rotation between the hollow connecting shaft 130 and the hollow core shaft 140 so as to prevent the elastic element 150 from being pressed excessively, setting the hollow connecting shaft 130 and the hollow core shaft 140 in a synchronous co-rotational relationship, and drive the rotor 30 to rotate.

On the contrary, when the external force decreases or stops driving the outer wheel 110 to rotate, the hollow core shaft 140 continues to rotate due to inertia of the rotor 30 and stretches the elastic element 150, and while being stretched, the elastic element 150 pulls the second end 132 of the hollow connecting shaft 130, thereby driving the hollow connecting shaft 130 to rotate relative to the outer wheel 110 in the second relative rotation direction so that the hollow connecting shaft 130 is disassociated from the co-rotational relationship with the outer wheel 110 and idles in the clutch wheel 120. At this time, if a rotation angle of the hollow connecting shaft 130 relative to the hollow core shaft 140 exceeds a predetermined value, the first protruding portion 133 of the hollow connecting shaft 130 contacts the second protruding portion 146 of the hollow core shaft 140, thereby stopping relative rotation between the hollow connecting shaft 130 and the hollow core shaft 140 so as to prevent the elastic element 150 from being stretched excessively, and to set the hollow connecting shaft 130 and the hollow core shaft 140 in a synchronous co-rotational relationship, in which the hollow connecting shaft 130 and the hollow core shaft 140 idle in the outer wheel 110. In addition, in a preferred embodiment of the present invention, in the pulley 10 of the present invention, the first protruding portion 133 and the second protruding portion 146 may not be disposed, the protruding ring 145 at the second end 142 of the hollow core shaft 140 is directly sleeved over the second end 132 of the hollow connecting shaft 130, and two ends of the elastic element 150 are fixedly connected to the stop wall 147 at the second end 142 of the hollow core shaft 140 and the stop wall 134 at the second end 132 of the hollow connecting shaft 130. Therefore, when an external force drives the outer wheel 110 to rotate, the outer wheel 110 rotates relative to the hollow connecting shaft 130 in the first relative rotation direction and drives, through the clutch wheel 120, the hollow connecting shaft 130 to rotate synchronously, and the hollow connecting shaft 130 drives, through the tight-fit component 160, the hollow core shaft 140 to rotate. At this time, if the friction provided by the tight-fit component 160 is insufficient to drive the hollow core shaft 140 to rotate, the stop wall 134 at the second end 132 of the hollow connecting shaft 130 presses the elastic element 150, and while being pressed, the elastic element 150 pushes the stop wall 147 at the second end 142 of the hollow core shaft 140, thereby driving the hollow core shaft 140 to rotate, so as to drive the rotor 30 of the alternator to rotate.

On the contrary, when the external force decreases or stops driving the outer wheel 110 to rotate, the hollow core shaft 140 continues to rotate due to inertia of the rotor 30 and drives, through the tight-fit component 160, the hollow connecting shaft 130 to rotate relative to the outer wheel 110 in the second relative rotation direction. At this time, if the friction provided by the tight-fit component 160 is insufficient to drive the hollow connecting shaft 130 to rotate, the hollow core shaft 140 stretches the elastic element 150, and while being stretched, the elastic element 150 pulls the second end 132 of the hollow connecting shaft 130, thereby driving the hollow connecting shaft 130 to rotate relative to the outer wheel 110 in the second relative rotation direction so that the hollow connecting shaft 130 is disassociated from the co-rotational relationship with the outer wheel 110 and idles in the clutch wheel 120.

Further, in a preferred embodiment of the present invention, in the pulley 10 of the present invention, the tight-fit component 160, the first protruding portion 133, and the second protruding portion 146 may not be disposed; the protruding ring 145 at the second end 142 of the hollow core shaft 140 is directly sleeved over the second end 132 of the hollow connecting shaft 130, and two ends of the elastic element 150 are fixedly connected to the stop wall 147 at the second end 142 of the hollow core shaft 140 and the stop wall 134 at the second end 132 of the hollow connecting shaft 130. In this manner, when an external force drives the outer wheel 110 to rotate, the outer wheel 110 rotates relative to the hollow connecting shaft 130 in the first relative rotation direction and drives, through the clutch wheel 120, the hollow connecting shaft 130 to rotate synchronously; the stop wall 134 at the second end 132 of the hollow connecting shaft 130 presses the elastic element 150, and while being pressed, the elastic element 150 pushes the stop wall 147 at the second end 142 of the hollow core shaft 140, thereby driving the hollow core shaft 140 to rotate.

On the contrary, when the external force decreases or stops driving the outer wheel 110 to rotate, the hollow core shaft 140 continues to rotate due to inertia of the rotor 30 and stretches the elastic element 150, and while being stretched, the elastic element 150 pulls the second end 132 of the hollow connecting shaft 130, thereby driving the hollow connecting shaft 130 to rotate relative to the outer wheel 110 in the second relative rotation direction so that the hollow connecting shaft 130 is disassociated from the co-rotational relationship with the outer wheel 110 and idles in the clutch wheel 120.

Although the present invention and advantages thereof are described in detail above, it should be understood that variations, alternative solutions, and modifications can be made herein without departing from the spirit and scope of the present invention which are defined in the appended patent application scope. Moreover, the scope of the present invention is not limited to the specific implementations of the process, machine, product, material composition, means, method, and steps described in the specification. For example, persons skilled in the art can easily learn from the disclosure of the present invention that existing or to-be-developed processes, machines, products, material compositions, means, methods and steps that substantially implement the same function or substantially achieve the same result as the corresponding implementation manner described herein may be used. Correspondingly, the appended patent application scope is intended to cover such processes, machines, products, material compositions, means, methods or steps.

We claim:

1. A pulley for an alternator, comprising:
   an outer wheel, provided with an axle hole at the center;
   a clutch wheel, fixedly disposed in the axle hole of the outer wheel and having a pivot hole;
   a hollow connecting shaft, having a first end and a second end, wherein the first end is rotatably disposed in the pivot hole of the clutch wheel so that the hollow connecting shaft maintains a co-rotational relationship with the outer wheel in a first relative rotation direction by means of the clutch wheel, while in a second relative rotation direction, the hollow connecting shaft is disassociated from the co-rotational relationship with the outer wheel and presents an idling state;
   a hollow core shaft, having a first end and a second end, wherein the hollow core shaft is rotatably received in the outer wheel, and the hollow core shaft passes through the hollow connecting shaft; the first end of the hollow core shaft protrudes from the first end of the hollow connecting shaft, and the second end of the hollow core shaft is rotatably arranged on the second end of the hollow connecting shaft; an elastic element, disposed between the second end of the hollow connecting shaft and the second end of the hollow core shaft; and
   a tight-fit component, sleeved over an outer circumferential wall surface of the first end of the hollow core shaft in a tight-fit manner and tightly fit with an end surface of the first end of the hollow connecting shaft so that the hollow connecting shaft and the hollow core shaft corotate coaxially under a friction between the tight-fit component and the hollow connecting shaft and a friction between the tight-fit component and the hollow core shaft;
   wherein when an external force drives the outer wheel to rotate, the outer wheel rotates relative to the hollow connecting shaft in the first relative rotation direction and drives, through the clutch wheel, the hollow connecting shaft to rotate synchronously, and the hollow connecting shaft drives, through the tight-fit component, the hollow core shaft to rotate; and if the friction provided by the tight-fit component is insufficient to drive the hollow core shaft to rotate at this time, the second end of the hollow connecting shaft presses the elastic element, and while being pressed, the elastic element pushes the second end of the hollow core shaft, thereby driving the hollow core shaft to rotate; and
   when the external force decreases or stops driving the outer wheel to rotate, the hollow core shaft continues to rotate due to inertia and drives, through the tight-fit component, the hollow connecting shaft to rotate relative to the outer wheel in the second relative rotation direction; and if the friction provided by the tight-fit component is insufficient to drive the hollow connecting shaft to rotate at this time, the hollow core shaft stretches the elastic element, and while being stretched, the elastic element pulls the second end of the hollow connecting shaft, thereby driving the hollow connecting shaft to rotate relative to the outer wheel in the second relative rotation direction so that the hollow connecting shaft is disassociated from the co-rotational relationship with the outer wheel and idles in the clutch wheel.

2. The pulley for an alternator according to claim 1, wherein the tight-fit component is a C-shaped retaining ring.

3. The pulley for an alternator according to claim 1, wherein the second end of the hollow connecting shaft is provided with a first protruding portion, and the second end of the hollow core shaft is provided with a corresponding second protruding portion; the number of one of the first protruding portion and the second protruding portion is at least one, and the number of the other of the first protruding portion and the second protruding portion is at least two; and when a rotation angle of the hollow connecting shaft relative to the hollow core shaft exceeds a predetermined value, the first protruding portion of the hollow connecting shaft contacts the second protruding portion of the hollow core shaft, thereby stopping relative rotation between the hollow connecting shaft and the hollow core shaft and setting the hollow connecting shaft and the hollow core shaft in a synchronous co-rotational relationship.

4. The pulley for an alternator according to claim 1, wherein a first ball bearing is sleeved over the first end of the hollow core shaft, a second ball bearing is sleeved over the second end of the hollow core shaft, and the first ball bearing and the second ball bearing are disposed between the hollow core shaft and the outer wheel so that the hollow core shaft is rotatable relative to the outer wheel.

5. The pulley for an alternator according to claim 4, wherein three grooves are provided in a concave manner on an inner circumferential wall surface of the outer wheel, and an anaerobic adhesive is coated in the grooves so that the clutch wheel, the first ball bearing, and the second ball bearing are separately tightly fit in the grooves and are fixedly glued in the outer wheel by using the anaerobic adhesive.

6. The pulley for an alternator according to claim 4, wherein a positioning casing is further sleeved over the first ball bearing, and an axial position of the pulley on the alternator is limited by the positioning casing.

7. The pulley for an alternator according to claim 1, wherein an outer circumferential wall surface of the outer wheel is provided with a belt groove for a belt to be wound on.

8. The pulley for an alternator according to claim 7, wherein the belt is connected to a mechanical energy generating source, and the mechanical energy generating source provides an external force to drive the belt, thereby driving the outer wheel to rotate.

9. The pulley for an alternator according to claim 8, wherein the mechanical energy generating source is an engine.

10. The pulley for an alternator according to claim 1, wherein an inner circumferential wall surface of the hollow core shaft is provided with a threaded surface, the threaded surface is screwed with a joint lever having corresponding threads, and the joint lever is connected to a rotor so that the hollow core shaft and the rotor corotate synchronously.

11. The pulley for an alternator according to claim 1, wherein an inner circumferential wall surface of the outer wheel is provided with a step portion, for the clutch wheel to abut against, thereby limiting an axial displacement of the clutch wheel.

12. The pulley for an alternator according to claim 1, wherein one end of the clutch wheel is provided with a positioning member to limit an axial position of the clutch wheel and the positioning member is a C-shaped retaining ring.

13. The pulley for an alternator according to claim 1, wherein the elastic element is a torque spring, and a wire profile of the torque spring is circular, elliptical, or rectangular.

14. The pulley for an alternator according to claim 13, wherein when the wire profile of the torque spring is rectangular, two end surfaces of the torque spring are grinded so as to enhance axial positioning of the torque spring and control a free length of the torque spring more precisely.

15. The pulley for an alternator according to claim 1, wherein two sides of the clutch wheel are each provided with an oil seal element so as to prevent liquid in the clutch wheel from flowing into the outer wheel.

16. The pulley for an alternator according to claim 15, wherein one side of one of the oil seal elements is provided with a positioning member, and the positioning member is sleeved over an inner side wall surface of the outer wheel in a tight-fit manner, to limit axial positions of the oil seal elements.

17. The pulley for an alternator according to claim 16, wherein the positioning member is a C-shaped retaining ring.

18. The pulley for an alternator according to claim 1, wherein an end, corresponding to the second end of the hollow core shaft, of the outer wheel is arranged with a dust cover so as to prevent external dust from entering the outer wheel.

19. The pulley for an alternator according to claim 1, wherein the clutch wheel includes a plurality of rolling members and a plurality of elastic members.

* * * * *